(12) United States Patent
Woodsend

(10) Patent No.: US 9,448,091 B2
(45) Date of Patent: Sep. 20, 2016

(54) VACUUM INSULATED VENTURI METER FOR AN EXHAUST GAS RECIRCULATION APPARATUS

(75) Inventor: Lance C. Woodsend, Hagerstown, MD (US)

(73) Assignee: MACK TRUCKS, INC., Greensboro, NC (US)

( * ) Notice: Subject to any disclaimer, the term of this patent is extended or adjusted under 35 U.S.C. 154(b) by 1 day.

(21) Appl. No.: 14/418,807

(22) PCT Filed: Aug. 14, 2012

(86) PCT No.: PCT/US2012/050709
§ 371 (c)(1),
(2), (4) Date: Jan. 30, 2015

(87) PCT Pub. No.: WO2014/027997
PCT Pub. Date: Feb. 20, 2014

(65) Prior Publication Data
US 2015/0153207 A1     Jun. 4, 2015

(51) Int. Cl.
| | |
|---|---|
| *G01F 1/44* | (2006.01) |
| *G01F 1/40* | (2006.01) |
| *F02D 21/08* | (2006.01) |
| *F02D 41/00* | (2006.01) |

(52) U.S. Cl.
CPC .................. *G01F 1/44* (2013.01); *F02D 21/08* (2013.01); *F02M 26/47* (2016.02); *G01F 1/40* (2013.01); *F02D 2041/0075* (2013.01); *F02M 26/05* (2016.02); *F02M 26/23* (2016.02)

(58) Field of Classification Search
CPC ............ G01F 1/44; G01F 1/40; F02M 26/47
USPC ...................... 123/568.11, 568.12; 73/861.63
See application file for complete search history.

(56) References Cited

U.S. PATENT DOCUMENTS

| | | | |
|---|---|---|---|
| 1,266,428 A | 5/1918 | Dodge | |
| 2,284,013 A | 5/1942 | Pardoe | |
| 2,607,743 A * | 8/1952 | Hession, Jr. ........ | B01F 3/04007 422/276 |
| 2,747,976 A | 5/1956 | Houdry | |
| 3,457,723 A | 7/1969 | Kerns | |
| 4,147,031 A | 4/1979 | Tanuma et al. | |
| 4,481,828 A | 11/1984 | Cheng | |
| 4,651,572 A * | 3/1987 | Albertz ...................... | G01F 1/44 73/706 |
| 4,730,500 A * | 3/1988 | Hughes ................. | A61M 15/00 73/861.22 |
| D296,530 S * | 7/1988 | Nowacki ............. | B01F 3/04007 D10/96 |

(Continued)

FOREIGN PATENT DOCUMENTS

| | | |
|---|---|---|
| GB | 1488812 A | 10/1977 |
| JP | H11311396 A | 11/1999 |
| JP | 2008255853 A | 10/2008 |

OTHER PUBLICATIONS

Office Action dated Feb. 2, 2016 of corresponding Japan application No. 2015-527430 translated.

(Continued)

*Primary Examiner* — Mahmoud Gimie
(74) *Attorney, Agent, or Firm* — Martin Farrell; Michael Pruden

(57) ABSTRACT

A venturi flow meter for an EGR apparatus includes an inner wall defining an interior space including a converging inlet section, a throat section, and a diverging outlet section and an outer wall surrounding the inner wall and attached to the inner wall, the outer wall being spaced from the inner wall to define an insulating space between the inner wall and the outer wall.

6 Claims, 2 Drawing Sheets

(56) References Cited

U.S. PATENT DOCUMENTS

| | | | |
|---|---|---|---|
| RE33,909 E * | 5/1992 | Brenner | G01N 25/60 366/17 |
| 5,127,173 A * | 7/1992 | Thurston | G01F 1/3227 73/202 |
| 6,058,787 A * | 5/2000 | Hughes | G01F 1/32 73/861.52 |
| 6,408,833 B1 | 6/2002 | Faletti | |
| 6,732,524 B2 | 5/2004 | Sponton | |
| 6,742,335 B2 | 6/2004 | Beck et al. | |
| 7,195,006 B2 | 3/2007 | Khair et al. | |
| 7,469,181 B2 | 12/2008 | Duffy et al. | |
| 7,610,818 B2 * | 11/2009 | Sanders | G01F 1/44 73/861.63 |
| 7,921,830 B2 | 4/2011 | Schneider et al. | |
| 2003/0234009 A1 * | 12/2003 | Kennedy | F02B 29/0418 123/568.12 |
| 2004/0007220 A1 | 1/2004 | Sponton | |
| 2010/0154758 A1 | 6/2010 | Schneider et al. | |
| 2013/0298882 A1 | 11/2013 | Stabnik et al. | |

OTHER PUBLICATIONS

International Search Report and Written Opinion of PCT/US2012/050709 dated Oct. 26, 2012.
International Preliminary Report on Patentability of PCT/US2012/050709 dated Jul. 30, 2014.
Extended European search report dated Apr. 22, 2016 of corresponding European application No. 12882940.5.

\* cited by examiner

VACUUM INSULATED VENTURI METER FOR AN EXHAUST GAS RECIRCULATION APPARATUS

FIELD OF THE INVENTION

The invention is directed to exhaust gas recirculation (EGR) apparatuses for internal combustion engines, and more particularly, to a vacuum insulated venturi metering device for an EGR apparatus.

BACKGROUND AND SUMMARY

In internal combustion engines, EGR systems recirculate engine exhaust gas to the engine intake as a method for reducing production of oxides of nitrogen (NOx). The addition of exhaust gas to the intake air reduces the oxygen content of the intake air. This results in lower combustion temperature, and because NOx production is temperature sensitive, lower production of NOx.

Some systems use cooled EGR, that is, exhaust gas that is passed through a heat exchanger. The temperature of cooled EGR gas can get close to the dew point. Further cooling, for example by contact with cooler components, can create significant amounts of condensation. EGR condensation includes soot and other undesirable constituents which can foul EGR components. One such component subject to fouling is a venturi device used to meter the EGR gas.

Conventional solutions to the problem of EGR condensation in a venturi include a system to supply engine coolant as a heat source to maintain a temperature of the venturi walls, which adds expense and complication. Other solutions include a glass fiber insulation wrap around the venturi, which is subject to wear and tear and which requires additional assembly steps.

The invention provides a device for insulating an EGR venturi meter. According to the invention, a venturi meter includes a vacuum space surrounding the venturi body to provide thermal insulation.

A venturi meter according to the invention includes a venturi body having an inner wall defining an inlet end, a throat, and an outlet end. An outer wall surrounds the inner wall and is spaced from the inner wall to provide an insulating space between the outer wall and the inner wall. The outer wall and inner wall are joined to form a seal to prevent air from entering or leaving the insulating space.

According to a preferred embodiment, the insulating space is evacuated to provide a vacuum insulated spaced surrounding the inner wall.

According to an alternative embodiment, the insulating space contains air or another gas having low thermal conductivity.

BRIEF DESCRIPTION OF THE DRAWINGS

The invention will be better understood with reference to the appended drawings, in which.

DETAILED DESCRIPTION

Figure 1:
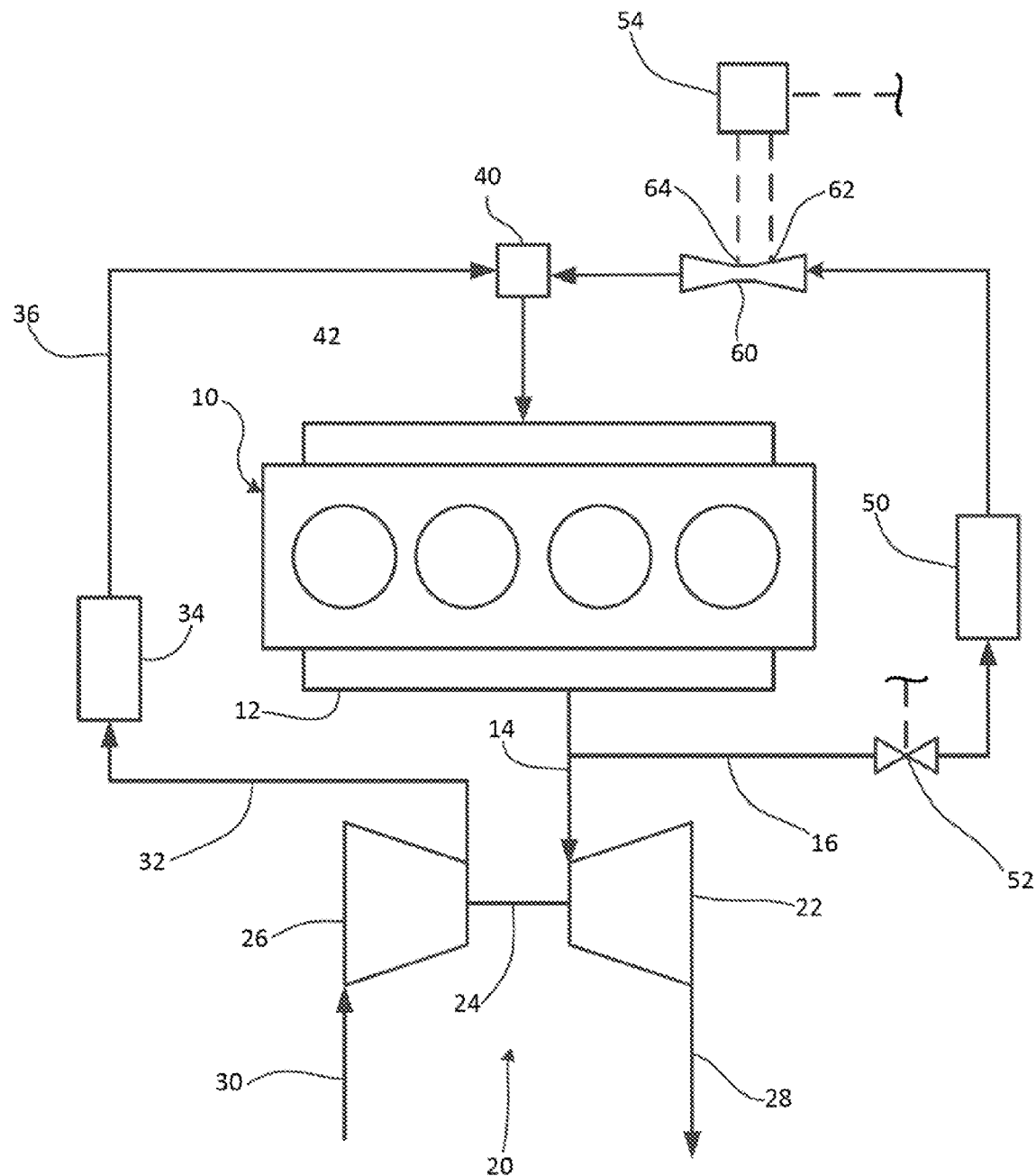
FIG. 1 is a schematic of an internal combustion engine and exhaust apparatus, including an exhaust gas recirculation system; and, FIG. 2 is a longitudinal section view of a venturi flow meter in accordance with the invention.

FIG. 1 shows a simplified schematic of an internal combustion engine 10. Engine exhaust is guided through an exhaust manifold 12 to an exhaust conduit 14. A portion of the exhaust gas is recirculated to the engine intake through an exhaust gas recirculation (EGR) conduit 16, which is further described below. The remainder of the exhaust gas is directed to an exhaust gas turbine 22 of a turbocharger 20. The exhaust gas flowing through the turbine 22 drives the turbine wheel (not shown) and shaft 24, which drives the compressor 26 of the turbocharger 20. From the turbine, the exhaust gas is released to the environment through a pipe 28, typically after passing through some aftertreatment systems (not shown). The compressor 26 draws ambient air through intake conduit 30, compresses the ambient air to form charge air. The charge air is guided through conduit 32 to a charge air cooler 34. Cooled charge air is guided through a conduit 36 to a mixer 40, where the cooled charge air mixes with recirculated exhaust gas. The mixture is then directed to the engine intake manifold 42.

Recirculated exhaust gas in conduit 16 is carried through and EGR valve 52 to an EGR cooler 50. The EGR valve 52 is operated by a controller 54 to control the amount of exhaust gas recirculated to the engine air intake, according to engine demand and NOx control requirements. The exhaust gas from the EGR valve 52 flows through a venturi metering device 60, which measures the quantity of exhaust gas flowing to the engine intake. The controller 54 is connected to receive a pressure signal from a differential pressure sensor installed in sensing communication with ports (see, FIG. 2) at the venturi metering device's inlet portion 62 and throat portion 64. Alternatively, individual pressure sensors may be provided in each of the venturi ports. A pressure differential between the inlet portion 62 and the throat portion 64 is used by the controller 54 to calculate mass flow through the venturi metering device 60. The controller 54 is configured to use the mass flow calculation in controlling the EGR valve 52.

The exhaust gas flows from the venturi metering device 60 to the mixer 40 to mix with charge air for the engine intake manifold 42.

EGR gas contains water vapor, soot, and other contaminants. A problem with cooled EGR arises from the gas temperature being brought near the dew point. Further cooling can result in condensation and deposition of water and solid contaminants in the EGR system. This can be a problem in venturi metering devices if condensation fouls the pressure sensor ports.

Figure 2:
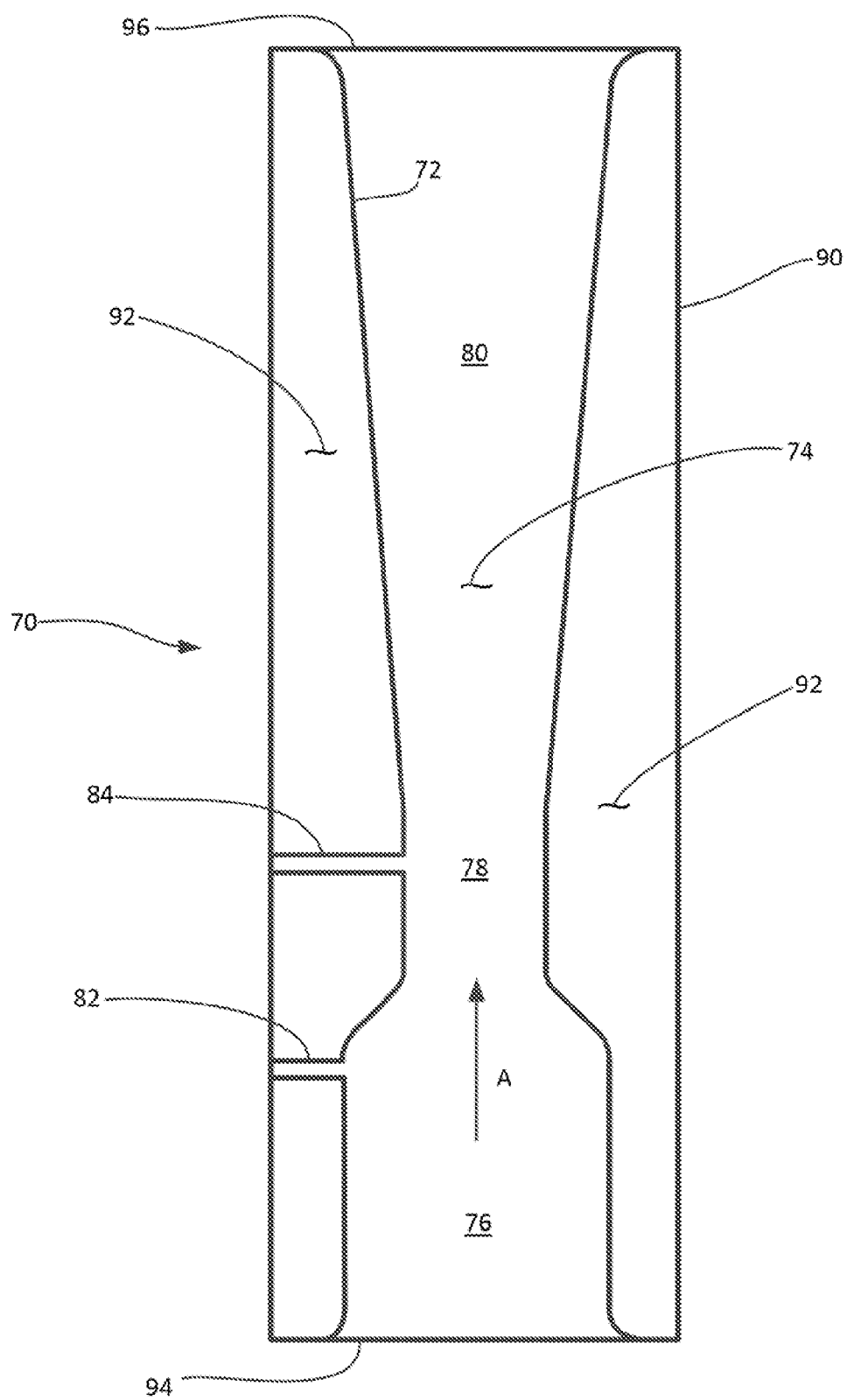

Turning to FIG. 2, a venturi metering device 70 according to the invention is illustrated in a longitudinal section view. The venturi 70 includes an inner wall 72 defining an interior space 74 including an inlet portion 76 having a cylindrical entry and a frustoconical transition section that converges in a flow direction (indicated by arrow A) to a throat section 78 at the narrowest part of the interior space 74. The interior space 74 then widens with the inner wall 72 diverging in a frustoconical outlet section 80.

A first port 82 is provided in the inner wall 72 at the inlet section 72. A second port 84 is provided in the inner wall 72 at the throat section 78. The first port 82 and second port 84 are passages formed to be in fluid communication with the interior space 74 to provide access for communication with a pressure sensor or sensors (not illustrated).

An outer wall 90 surrounds the inner wall 72 and is spaced outwardly from the inner wall to provide an insulating space 92 between the inner wall and the outer wall. In the illustrated example, the venturi 70 has a circular cross-section and the outer wall 90 is spaced radially outward of the inner wall 72 to define an annular space around the inner wall. The outer wall 90 and the inner wall 72 are joined at the inlet end 94 and outlet end 96 in a way that forms an airtight seal and supports the inner wall and outer wall in spaced relation. The inner wall 72 and outer wall 90 may be joined by welding or other suitable method. Joining the inner wall 72 and outer wall 90 at the ends 94, 96, provides that the insulating space 92 extends from the inlet end 94 to the outlet end 96. According to a preferred embodiment of the invention, the insulating space 92 is evacuated to provide a vacuum insulating space. Alternatively, the insulating space 92 may contain air or another gas.

The inner wall 72 and outer wall 90 may be formed of a metal, such as stainless steel. However, any material capable of being shaped and joined to form a seal, as described here may be used.

The invention has been described in terms meant to be illustrative rather than limiting. Those skilled in the art will understand that the invention is defined by the appended claims.

What is claimed is:

1. A Venturi flow meter in a cooled EGR apparatus, comprising:
    an exhaust gas recirculation conduit connectable to an exhaust conduit of an internal combustion engine;
    an EGR cooler connected in the exhaust gas recirculation conduit; and,
    a Venturi flow meter connected in the exhaust gas recirculation conduit to receive exhaust gas from the EGR cooler, wherein, the Venturi flow meter comprises:
        an inner wall defining an interior space including a converging inlet section, a throat section, and a diverging outlet section; and,
        an outer wall surrounding the inner wall and attached to the inner wall, the outer wall being spaced from the inner wall to define an insulating space between the inner wall and the outer wall, wherein the inner and outer walls are sealed and the insulating space is evacuated.

2. The Venturi flow meter as claimed in claim 1, comprising a first pressure sensing port in fluid communication with the interior space at the inlet section and a second pressure sensing port in fluid communication with the throat section.

3. An internal combustion engine exhaust apparatus, comprising:
    an exhaust conduit connectable to an engine exhaust manifold;
    an exhaust gas recirculation conduit connected to the exhaust conduit;
    a valve on the exhaust gas recirculation conduit for controlling flow of exhaust gas through the exhaust gas recirculation conduit;
    an exhaust gas recirculation cooler connected on the exhaust gas recirculation conduit to cool exhaust gas for recirculation to the engine; and,
    a Venturi flow meter connected on the exhaust gas recirculation conduit to receive cooled exhaust gas from the exhaust gas recirculation cooler, the Venturi flow meter including an inner wall defining an interior space including a converging inlet section, a throat section, and a diverging outlet section and an outer wall surrounding the inner wall and attached to the inner wall, the outer wall being spaced from the inner wall to define an insulating space between the inner wall and the outer wall, wherein the insulating space is evacuated.

4. The internal combustion engine exhaust apparatus of claim 3, wherein the Venturi flow meter includes pressure sensing means mounted in fluid communication with the interior space at the inlet section and in fluid communication with the interior space at the throat section.

5. The internal combustion engine exhaust apparatus of claim 4, further comprising a controller operatively connected to the valve to control opening and closing of the valve, and connected to receive pressure signals from the pressure sensing means, the controller being configured to calculate exhaust gas mass flow rate through the Venturi flow meter from the pressure signals and responsive thereto to operate the valve.

6. A Venturi flow meter in a cooled EGR apparatus, comprising:
    an exhaust gas recirculation conduit connectable to an exhaust conduit of an internal combustion engine;
    an EGR cooler connected in the exhaust gas recirculation conduit; and,
    a Venturi flow meter connected in the exhaust gas recirculation conduit to receive exhaust gas from the EGR cooler, wherein, the Venturi flow meter comprises:
        an inner wall defining an interior space including a converging inlet section, a throat section, and a diverging outlet section; and,
        an outer wall surrounding the inner wall and attached to the inner wall, the outer wall being spaced from the inner wall to define an insulating space between the inner wall and the outer wall, wherein the inner and outer walls are sealed and the insulating space contains air.

* * * * *